(12) United States Patent
McKinney

(10) Patent No.: US 10,974,667 B2
(45) Date of Patent: Apr. 13, 2021

(54) APPARATUS, DEVICE AND METHOD ENABLING REPEATED COUPLING AND DECOUPLING OF PHYSICAL OBJECTS

(71) Applicant: Michael McKinney, Prunedale, CA (US)

(72) Inventor: Michael McKinney, Prunedale, CA (US)

( * ) Notice: Subject to any disclaimer, the term of this patent is extended or adjusted under 35 U.S.C. 154(b) by 0 days.

(21) Appl. No.: 16/531,079

(22) Filed: Aug. 4, 2019

(65) Prior Publication Data

US 2021/0031708 A1 Feb. 4, 2021

(51) Int. Cl.
*F16M 11/00* (2006.01)
*B60R 13/10* (2006.01)
*F16M 13/02* (2006.01)

(52) U.S. Cl.
CPC ........... *B60R 13/105* (2013.01); *F16M 13/02* (2013.01)

(58) Field of Classification Search
CPC ............................... B60R 9/06; B60R 13/065
See application file for complete search history.

(56) References Cited

U.S. PATENT DOCUMENTS

| | | | |
|---|---|---|---|
| 4,657,296 A | 4/1987 | Nishii et al. | |
| 4,917,426 A | 4/1990 | Copp | |
| 5,518,350 A | 5/1996 | Kyprios | |
| 5,570,826 A | 11/1996 | Garbes et al. | |
| 5,603,178 A | 2/1997 | Morrison | |
| 5,813,640 A | 9/1998 | Koch et al. | |
| 6,007,033 A | 12/1999 | Casson et al. | |
| 6,729,053 B2 | 5/2004 | Castro | |
| 6,757,998 B1 | 7/2004 | Lucatorto | |
| 6,945,551 B2 | 9/2005 | Blake | |
| 7,401,427 B2 | 7/2008 | Zander | |
| 7,818,905 B1 | 10/2010 | Stahel et al. | |
| 8,245,996 B1 | 8/2012 | Ciabaszewski | |
| 9,056,590 B2 * | 6/2015 | McKinney | B60R 13/105 |
| 9,566,758 B2 | 2/2017 | Cheung et al. | |
| 9,702,388 B2 | 7/2017 | Trojanowski | |
| 9,901,451 B2 | 2/2018 | Conway et al. | |
| 9,902,344 B2 | 2/2018 | Martin | |
| 9,963,089 B2 | 5/2018 | Torrey, Jr. et al. | |
| 10,029,422 B2 | 7/2018 | Meisner et al. | |
| 2007/0028490 A1 | 2/2007 | Beer et al. | |
| 2010/0101123 A1 | 4/2010 | Pacleb | |
| 2014/0237870 A1 | 8/2014 | Eidsmore | |
| 2020/0130600 A1 * | 4/2020 | Morgan | B60R 9/06 |

\* cited by examiner

*Primary Examiner* — Amy J. Sterling
(74) *Attorney, Agent, or Firm* — Patrick Reilly

(57) ABSTRACT

A license plate holder includes a unitary body that forms one or more channels that permit a license plate to frequently and quickly be attached to, detached from and/or reattached to the unitary body. The unitary body is attached to an equipment or vehicle. One or two posts are coupled with the license plate and are shaped for partial insertion into, or traversal through, a channel of the unitary body. A moveable retaining pin allows a post to be temporarily captured while the post is inserted into a channel of the unitary body. The retaining pin may be spring-biased to press against the inserted post, and the retaining pin may be shaped and sized to fit into a notch or depressed feature of the inserted post. The unitary body may be or comprise an extruded component, a machined component, a milled component and/or a molded component.

22 Claims, 20 Drawing Sheets

FRONT VIEW OF DEVICE 100 ATTACHED TO SECOND PLATE 1200

OVOID

APPARATUS, DEVICE AND METHOD ENABLING REPEATED COUPLING AND DECOUPLING OF PHYSICAL OBJECTS

FIELD OF THE INVENTION

The present invention relates generally to methods to removably couple mechanical elements. More particularly the present invention relates to devices that enable quick connect and disconnect or repeated coupling and decoupling of physical objects.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

There are many license plate cover designs used to hold license plates to automobiles, vehicles and other equipment. Automobile and other vehicular and equipment license plates as issued by governmental authorities are primarily designed to be easily readable and sometimes to emphasize an actual or notional quality of the jurisdiction issuing the license plate. License plates are thus not uncommonly garish, mundane and visually unappealing. Yet the prior art fails to optimally provide a license plate holder that both secures a license plate to an equipment, vehicle or an automobile and also allows a user to easily and quickly detach and reattach a license plate from an associated equipment, automobile body or vehicle frame, so as to allow a convenient temporary removal of the license plate from the equipment, automobile or vehicle and to thus temporarily avoid diminishing the aesthetic effect of the design of the associated equipment, automobile or vehicle by a sometimes undesired and/or jarring visual presence of the license plate.

SUMMARY AND OBJECTS OF THE INVENTION

Towards these objects and other objects that will be made obvious in light of the present disclosure, a device, system and method are disclosed that enable a quick and repeatable connection and disconnection of a license plate from an equipment, automobile or vehicle. A first preferred embodiment of the present invention includes a unitary body forming a first elongate tubing and a second elongate tubing extending from a joining feature, and a moveable element, the moveable element removably extending at least partially into the first elongate tubing, whereby the moveable element alternately couples and decouples the unitary body to a first detachable element when the first detachable element is inserted within the first elongate tubing. The moveable element may be threaded and/or may be or comprise a pull-pin, a set screw, and/or other insertable, positionable and/or removable suitable fastener known in that art. The unitary body may be 3-D printed, extruded, molded, cut, welded, pressed, and/or punched, or otherwise formed by suitable methods known in the art. Alternatively or additionally, the unitary body can be manufactured from or constructed of a variety of materials in singularity or combination, to include organic, wood, cellulose or other fibrous materials, plastics, composites, carbon fiber, fiberglass, metals or other materials that can be shaped, extruded, formed and/or fused together into the desired shape. Further additionally or alternatively, the first elongate tubing and/or the second elongate tubing can be formed into circular, ovoid, triangular, square or rectangular cross sectional shapes, or formed into one of many suitable shapes having cross-sections known in the art.

According to one optional aspect of the invented method, the first detachable element is attached to a license plate. According to another optional aspect of the invented method, the first detachable element and an additional second detachable element are both coupled with a same license plate, wherein the first detachable element is sized and shaped for at least partial insertion into the first elongate tubing and the additional second detachable element is sized and shaped and positioned relative to the first detachable element for simultaneous partial insertion into, or insertion entirely through, the second elongate tubing.

According to other optional aspects of the invented method, the first elongate tubing and/or the second elongate tubing presents a circular, ovoid, orthogonal or triangular cross section that is normal to a central axis of the respective elongate tubing, wherein the central axes of the two elongate tubings are preferably parallel and are centered through a channel that are each separately formed by an elongate tubing. It is understood that the first detachable element and the second detachable element are respectively shaped and undersized relative to the first elongate tubing and the second elongate tubing to enable (a.) at least partial insertion of first detachable element and the second detachable element respectively into the first elongate tubing and the second elongate tubing respectively; and/or (b.) complete traversal of the first detachable element and the second detachable element respectively through the first elongate tubing and the second elongate tubing respectively.

An additional optional aspect of the invented method provides a spring biasing quality or element of the moveable element, whereby the moveable element removably presses against or into the first detachable element.

In yet another optional aspect of the present invention, the first elongate tubing and the second elongate tubing extend from a same side of the joining feature. In an alternate optional aspect of the present invention, the first elongate tubing extends from a first side of the joining feature and the second elongate tubing extends from a second side of the joining feature. In an alternate optional aspect of the present invention, the first side of the joining feature and the second side of the joining feature are opposing sides.

It is understood that the unitary body may be formed by an extrusion and/or be extruded prior to formation of the first aperture through which the moveable element extends. It is further understood that certain alternate preferred embodiments of the unitary body may be or include a molded piece, a machined piece, and/or a milled piece.

In various even additional alternate preferred embodiments of the invented method, the unitary body may include metal, metal alloy, aluminum, iron, steel, plastic, and/or thermoplastic.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

INCORPORATION BY REFERENCE

All publications, patents, and patent applications mentioned in this specification are herein incorporated by reference to the same extent as if each individual publication, patent, or patent application was specifically and individually indicated to be incorporated by reference. U.S. Pat. No. 10,029,422 issued on Jul. 24, 2018 to Meisner, et al.; U.S. Pat. No. 9,901,451 issued on Feb. 27, 2018 to Conway, et al.; U.S. Pat. No. 9,702,388 issued on Jul. 11, 2017 to Joseph Trojanowski; U.S. Pat. No. 9,566,758 issued on Feb. 14, 2017 to Cheung, et al.; U.S. Pat. No. 9,056,590 issued on Jun. 16, 2015 to Michael McKinney; U.S. Pat. No. 5,570,826 issued on Nov. 5, 1996 to Garbes et al.; U.S. Pat. No. 5,603,178 issued on Feb. 18, 1997 to Arthur Morrison; U.S. Pat. No. 6,007,033 issued on Dec. 28, 1999 to Casson et al.; U.S. Pat. No. 6,945,551 issued on Sep. 20, 2005 to Robert Blake; U.S. Pat. No. 7,818,905 issued on Oct. 26, 2010 to Stahel et al.; U.S. Pat. No. 8,245,996 issued on Aug. 21, 2012 Ciabaszewski; U.S. Pat. No. 9,902,344 issued on Feb. 27, 2018 to Darren Martin; U.S. Pat. No. 9,963,089 issued on May 8, 2018 to Torrey, Jr., et al.; United States Patent Application No. 2010/0101123 to Inventor Pacleb, Jesus published on Apr. 29, 2010; U.S. Patent Publication No. 2014/0237870 to Eidsmore published on Aug. 28, 2014; U.S. Pat. No. 7,401,427B2 issued on Jul. 22, 2008 to Carl Alfred Zander; United States Patent 20070028490 issued on Feb. 8, 2007 to Beer et al.; U.S. Pat. No. 6,757,998 issued on Jul. 6, 2004 to Patrick M. Lucatorto; U.S. Pat. No. 6,729,053 issued on May 4, 2004 to James Castro; U.S. Pat. No. 5,813,640 issued on Sep. 29, 1998 to Koch et al.; U.S. Pat. No. 5,518,350 issued on May 21, 1996 to Petros Kyprios; U.S. Pat. No. 4,917,426 issued on Apr. 17, 1990 to David F. Copp; and U.S. Pat. No. 4,657,296 issued on Apr. 14, 1987 to Nishii et al. are each incorporated into the present disclosure herein by reference in their entirety and for all purposes.

BRIEF DESCRIPTION OF THE FIGURES

These, and further features of the invention, may be better understood with reference to the accompanying specification and drawings depicting the preferred embodiment, in which.

DETAILED DESCRIPTION

For the purposes of clarity of explanation three mutually orthogonal axes are presented within the Figures, wherein the three presented axes are the X axis, the Y axis and the Z axis.

Figure 1:
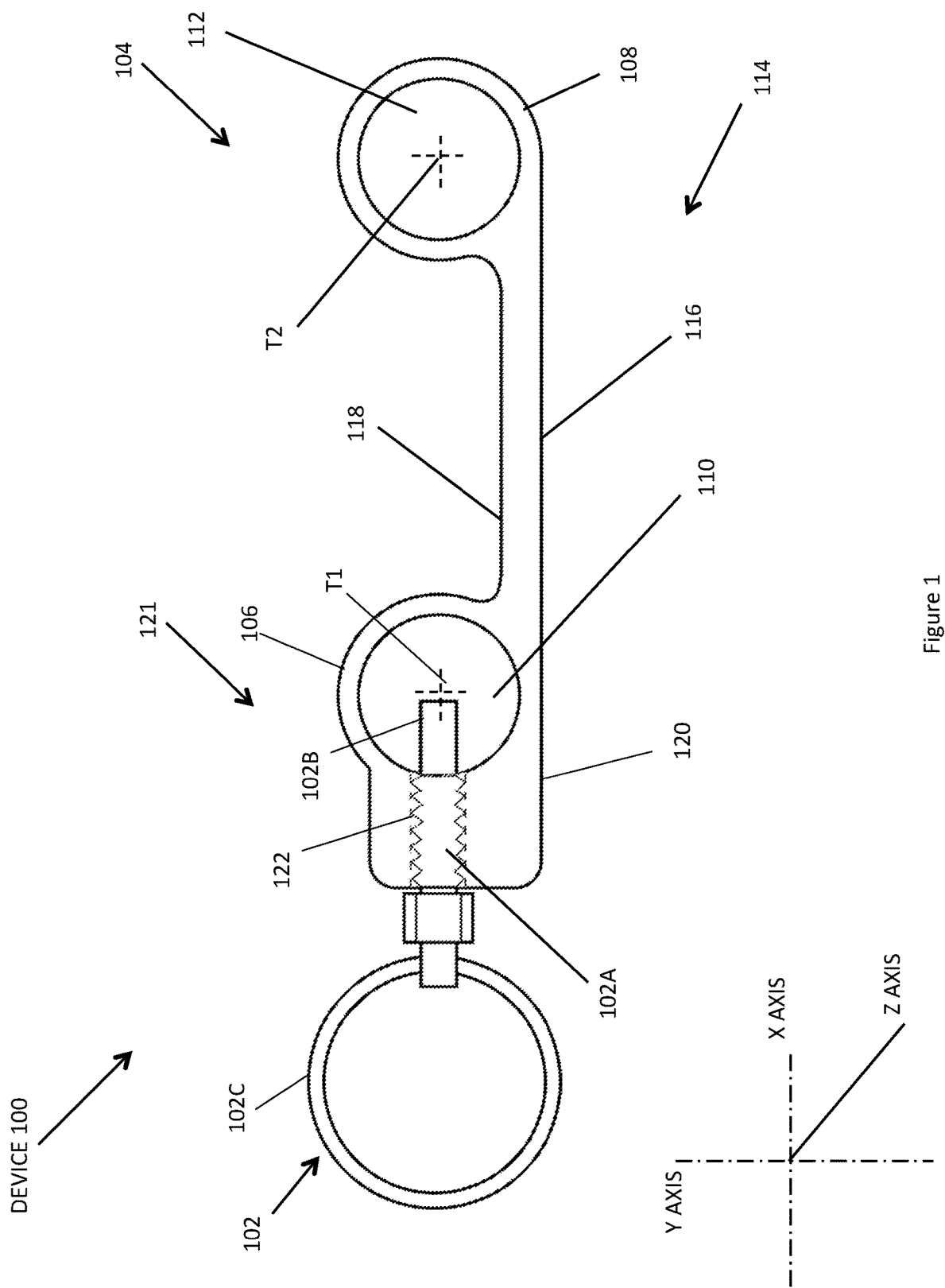
FIG. 1 is a front plan view of a first preferred embodiment of the present invention (hereinafter, "the first device") wherein the moveable element is coupled with the unitary body.

Referring now generally to the Figures and particularly to FIG. 1, FIG. 1 is a front plan view of a first preferred embodiment of the present invention (hereinafter, "the first device" 100) wherein a moveable element 102 is coupled with a unitary body 104. The unitary body 104 forms a first elongate tubing 106 and a second elongate tubing 108.

A first channel 110 is formed within the first elongate tubing 106 that extends uniformly along a first elongate axis T1; the first elongate axis T1 extends in parallel to the Z axis. The first channel 110 preferably presents a constant circular cross-section parallel to an X-Y plane that extends in parallel to both the X axis and the Y axis. The first elongate axis T1 passes perpendicularly through the center of the circular cross-section of the first channel 110.

A second channel 112 is formed within the first elongate tubing 106 and extends uniformly along a central second elongate axis T2; the second elongate axis T2 extends in parallel to both the Z axis and the first elongate axis T1. The second channel 112 preferably presents a constant circular cross-section parallel to the X-Y plane, wherein the second elongate axis T2 passes perpendicularly through the center of the circular cross-section of the second channel 112. In the exemplary first device 100, and mentioned for the sake of clarity of explanation and not as a limitation of the scope of the present invention, the second elongate axis T2 and the first elongate axis T1 are displaced 1.5 inches along the X axis.

Figure 13A:
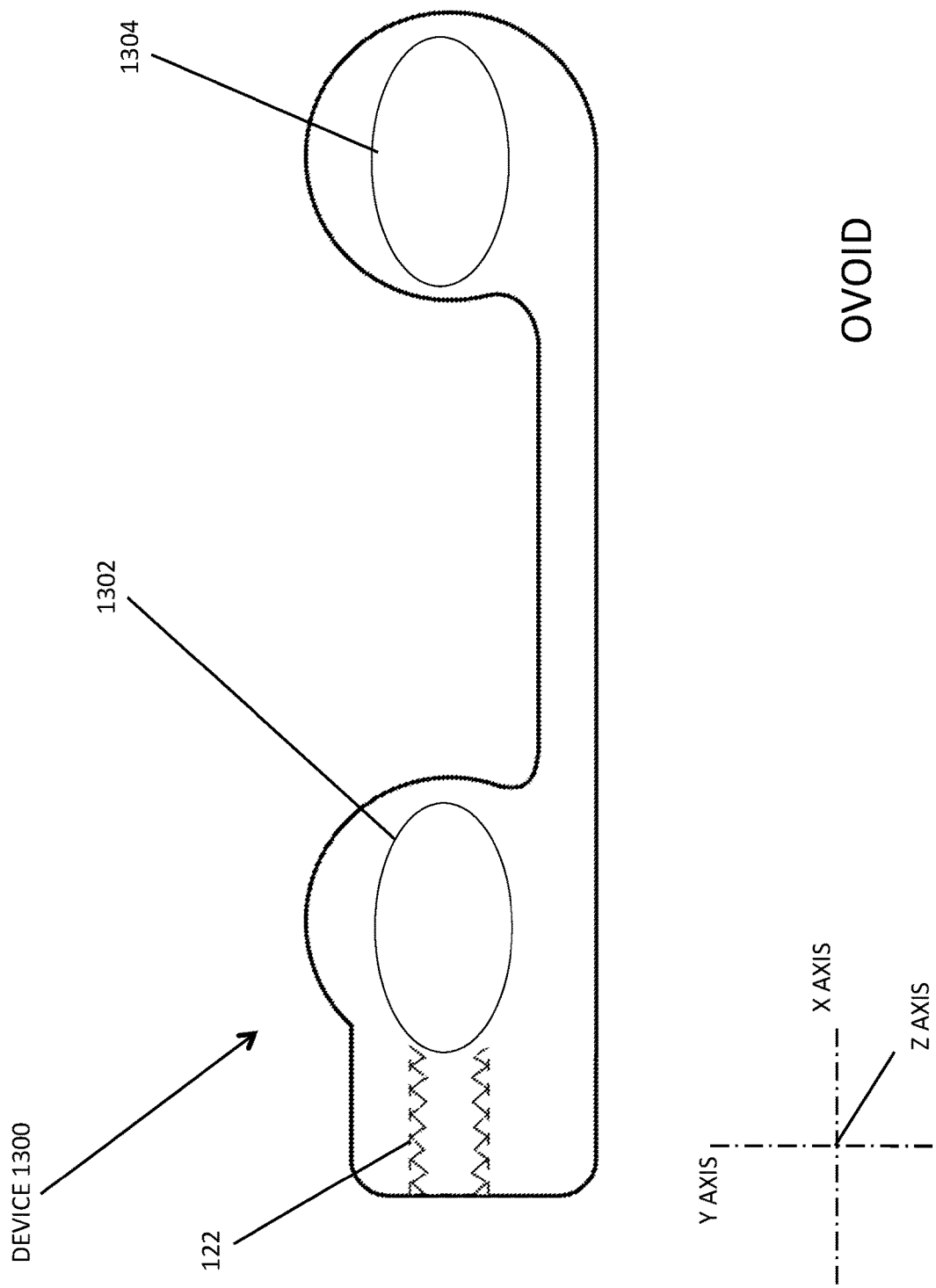
FIG. 13A is a front view of a second invented device having a pair of ovoid channels.
Figure 13B:
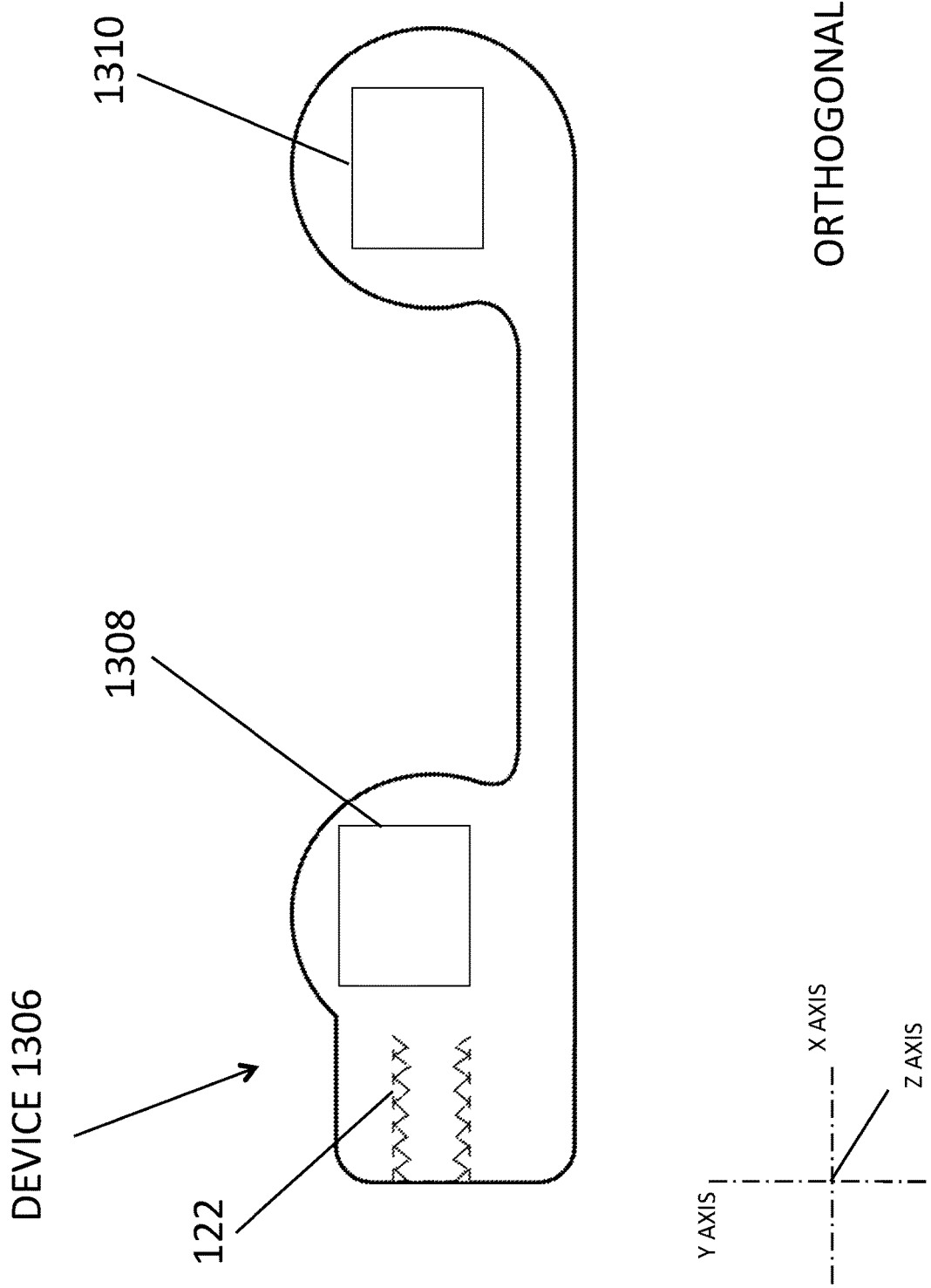
FIG. 13B is a front view of a second invented device having a pair of orthogonal channels
Figure 13C:
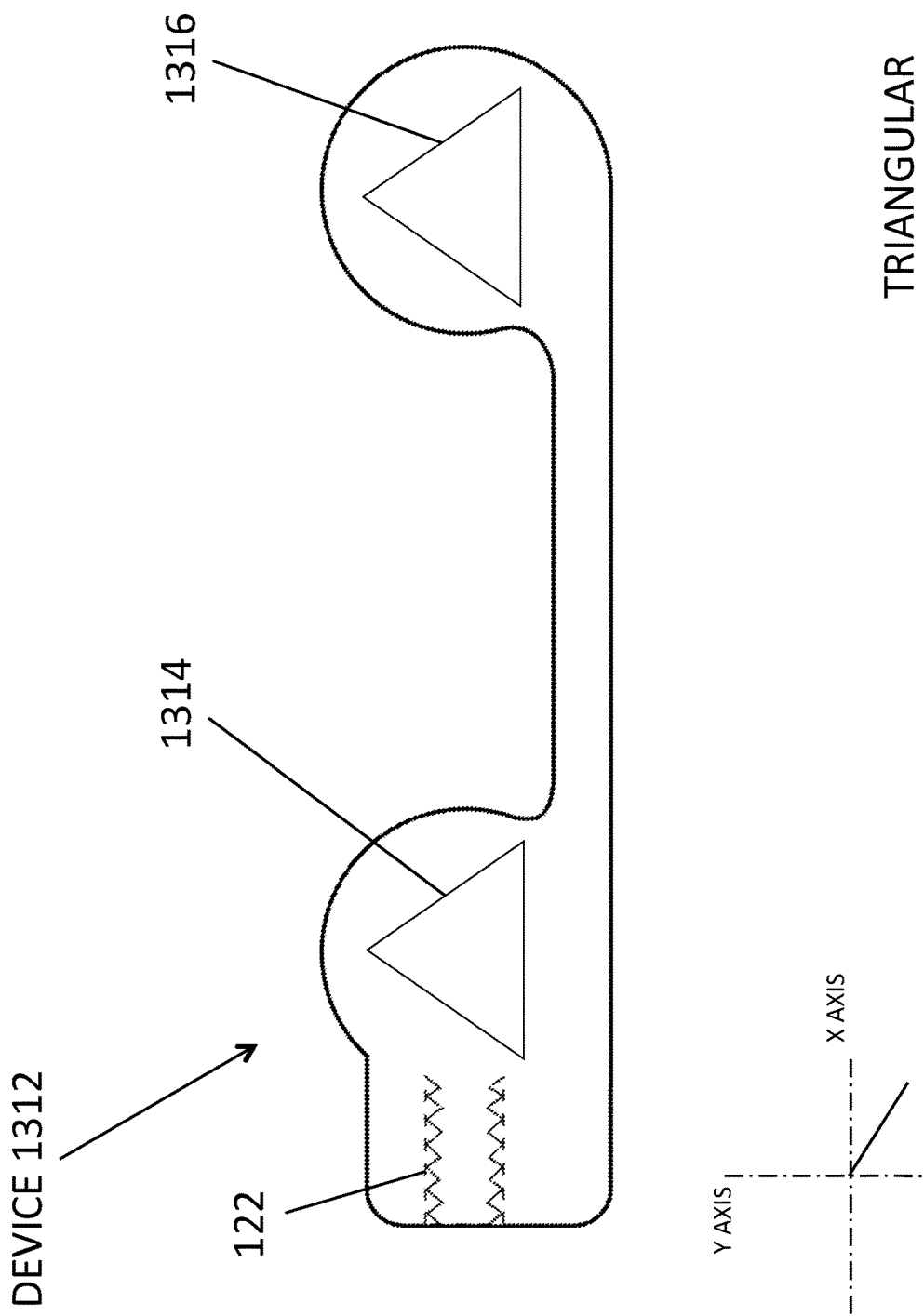
FIG. 13C is a front view of a second invented device having a pair of triangular channels.

The circular cross-sections of the first channel 110 and the second channel 112 may each be, and offered for the sake of clarity of explanation and not as a limitation of the scope of the present invention, in diameter 0.380 inches and with a tolerance of plus or minus 0.003 inch. Additionally, it is understood that the first channel 110 and the second channel 112 need not have a round cross-section, and might instead form an ovoid, triangular, or orthogonal cross-section, as shown in FIGS. 13A-13C, or some other shape, as appropriate in various embodiments of the present invention.

The unitary body 104 further defines a joining feature 114 that extends at least from the first elongate tubing 106 to the second elongate tubing 108 and comprises a planar plate surface 116 and a planar lower surface area 118. The planar plate surface 116 extends in parallel to an X-Z plane that extends in parallel to both the X axis and the Z axis. The planar lower surface area 118 also extends in parallel to the X-Z plane and is bordered by the first elongate tubing 106 and the second elongate tubing 108. The joining feature 114 optionally further includes a stiffening portion 120 that is both integrated with and extends from the first elongate tubing 106. The first elongate tubing 106 and the stiffening portion 120 together comprise an elongate formation 121.

A tapped first aperture 122 extends fully through the first elongate tubing 106 and the stiffening portion 120. The tapped first aperture 122 may be formed either (a.) in a molding or 3D printing of the unitary body 104, or (b.) by milling or drilling after the unitary body 104 has been molded, 3D printed or otherwise fabricated by suitable methods known in the art.

The moveable element 102 includes a threaded cylinder 102A that is sized and shaped to engage with the tapped first aperture 122. A moveable pull pin post 102B is captured within and extends freely and moveably within and through the threaded cylinder 102A. The moveable pull pin post 102B is adapted to press against a first post 600 of FIG. 6 under a spring force provided within the moveable element 102. It is understood that the first post may include a notch (not shown) that is sized to accept the moveable pull pin post 102B and thereby enable a convenient registration of the pull pin post 102B when inserted into this notch of the first post 600. A pull ring 102C is coupled to the pull pin post 102B and is adapted enable a user (not shown) to apply a finger to pull the pull pin post 102B away from and fully out of the first channel 110.

The moveable element 102 may be or comprise a Part Number SP4C0-SR-X-70X™ Stainless Steel Pull-pin as marketed by Innovative Components, Inc. of Schaumburg, Ill. or another suitable pull-pin part known in the art.

Figure 2:
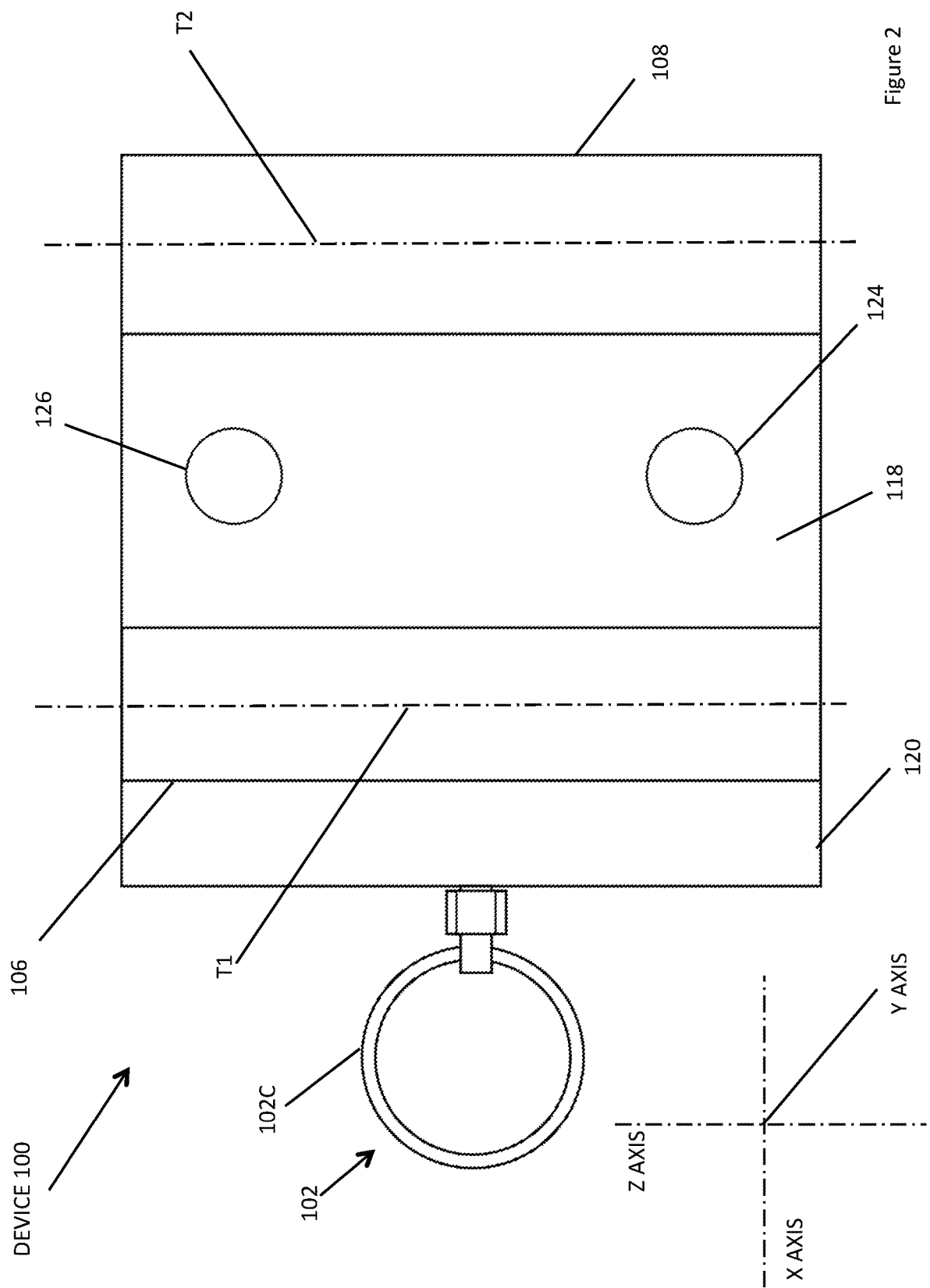
FIG. 2 is a top plan view of the first device of FIG. 1.

Referring now generally to the Figures and particularly to FIG. 2, FIG. 2 is a top plan view of the first device 100. A first attachment aperture 124 and a second attachment aperture 126 each extend fully through the joining feature 114. It is understood that the first attachment aperture 124 and the second attachment aperture 126 are adapted to support ease of coupling with a vehicle 127 as presented in FIG. 14A. It is understood that the first attachment aperture 124 and the second attachment aperture 126 may be formed either (a.) in a molding or 3D printing of the unitary body 104, or (b.) by a milling or drilling after the unitary body 104 has been molded, 3D printed or otherwise fabricated by suitable methods known in the art.

Figure 3:
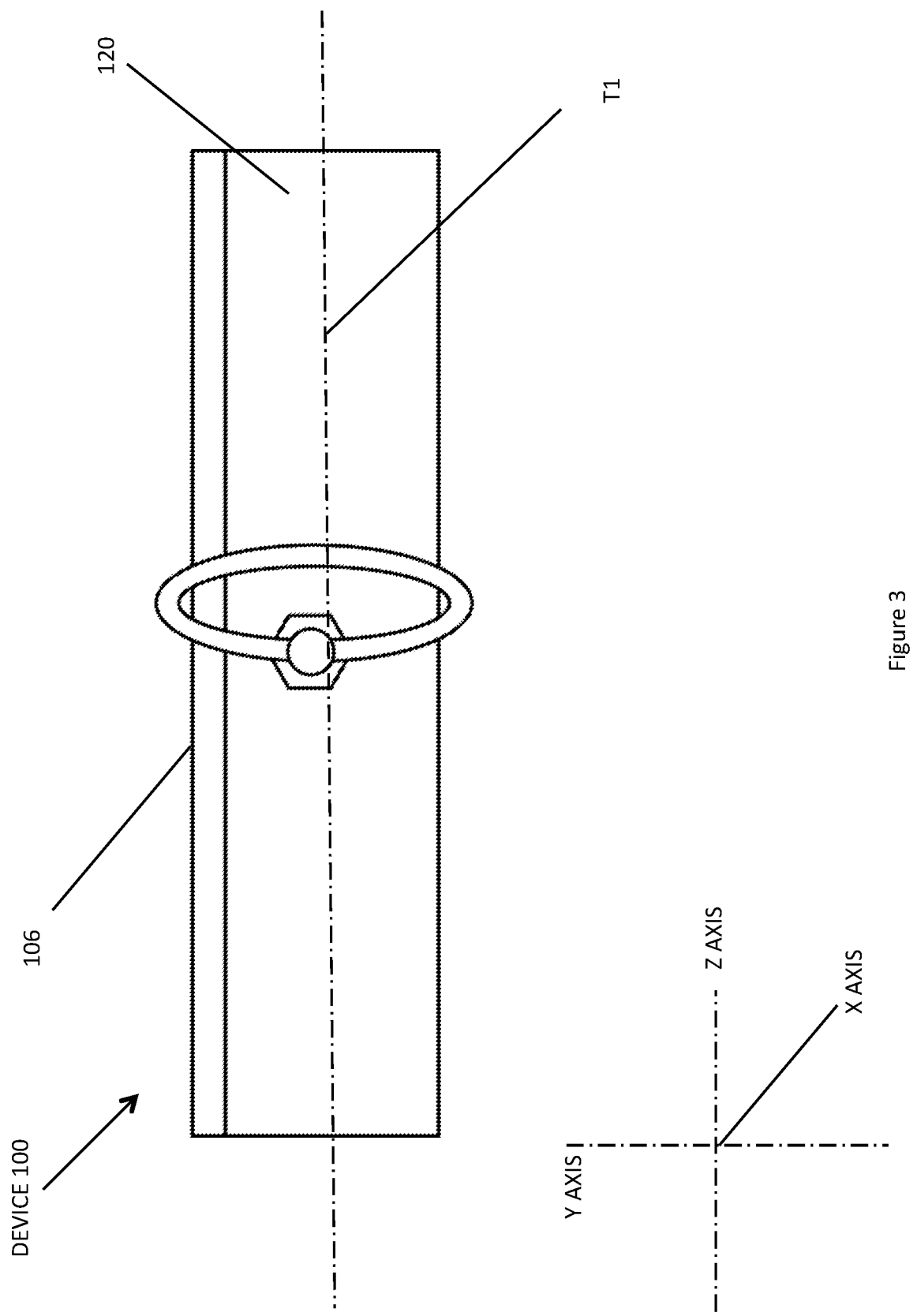
FIG. 3 is a right side plan view of the first device of FIG. 1.

Referring now generally to the Figures and particularly to FIG. 3, FIG. 3 is a right side plan view of the first device 100.

Figure 4:
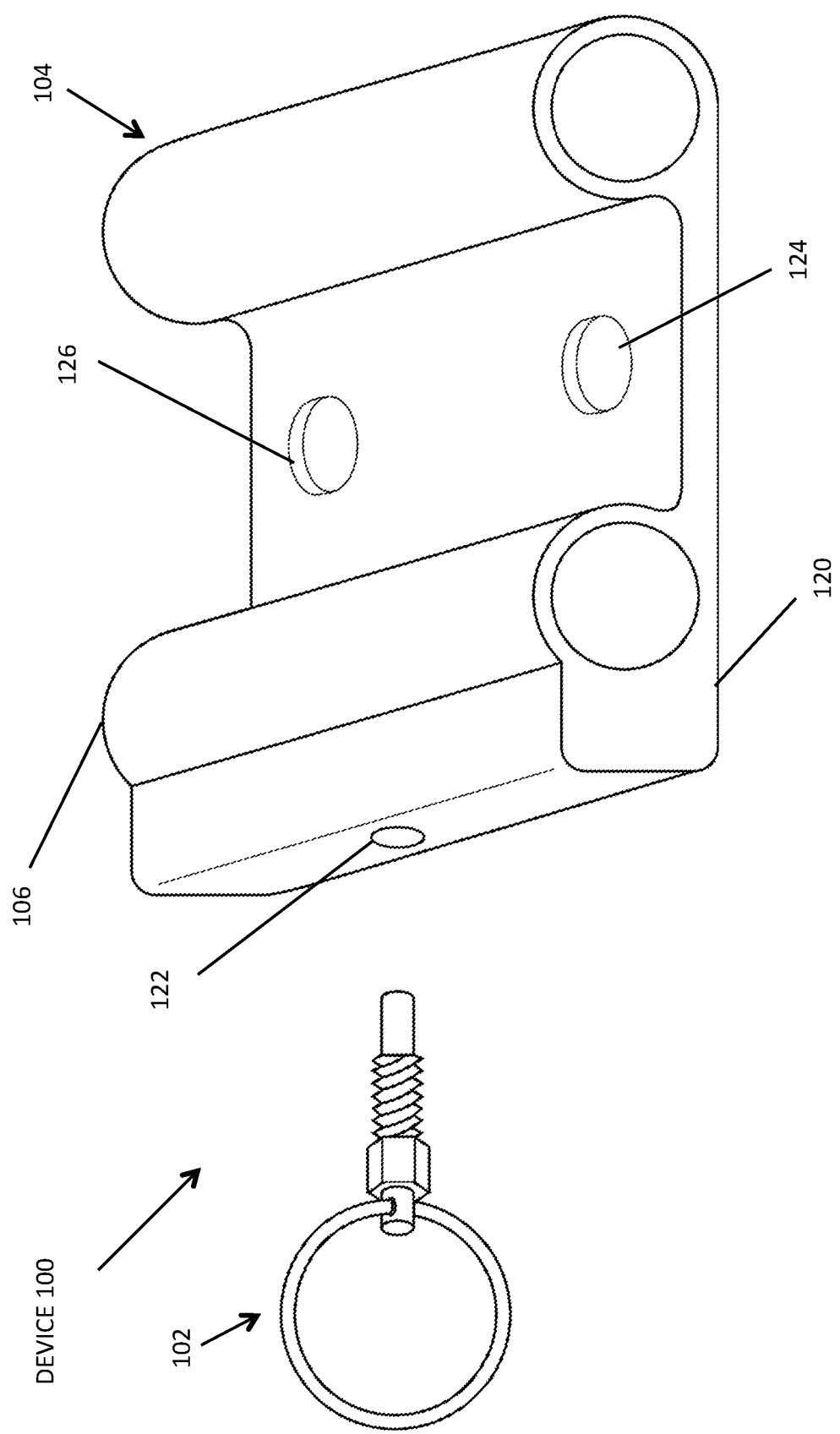
FIG. 4 is an exploded upper perspective view of the invented device of FIG. 1 and showing the moveable element removed from the unitary body.

Referring now generally to the Figures and particularly to FIG. 4, FIG. 4 is an exploded upper perspective view of the first device 100 and showing the moveable element 102 detached from the unitary body 104.

Figure 5:
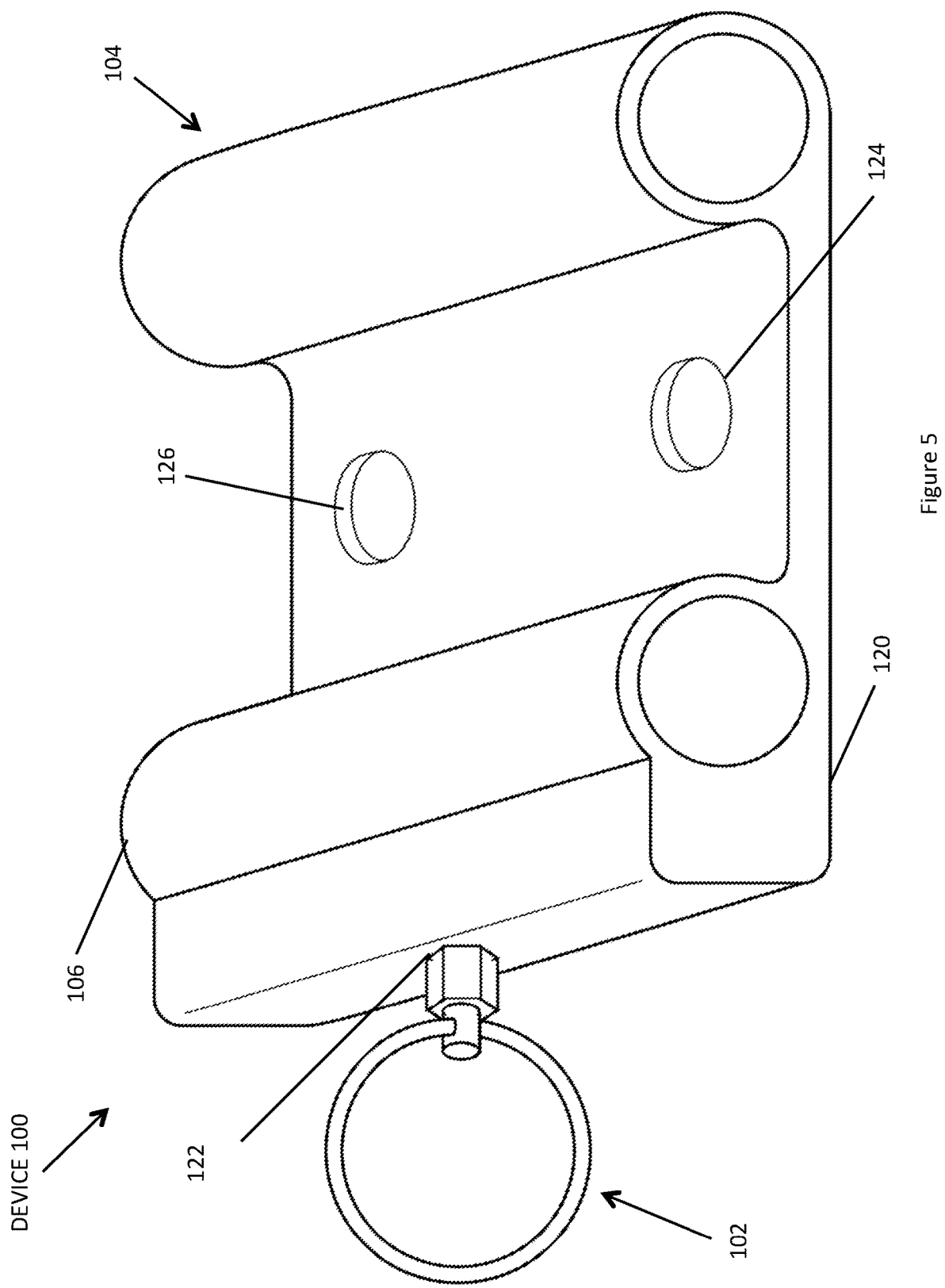
FIG. 5 is an upper perspective view of the invented device of FIG. 1 and showing the moveable element coupled with the unitary body.

Referring now generally to the Figures and particularly to FIG. 5, FIG. 5 is an upper perspective view of the first device 100 and showing the moveable element 102 coupled with the unitary body 104, wherein the threaded cylinder 102A is inserted within and engaged with the tapped first aperture 122.

Figure 6:
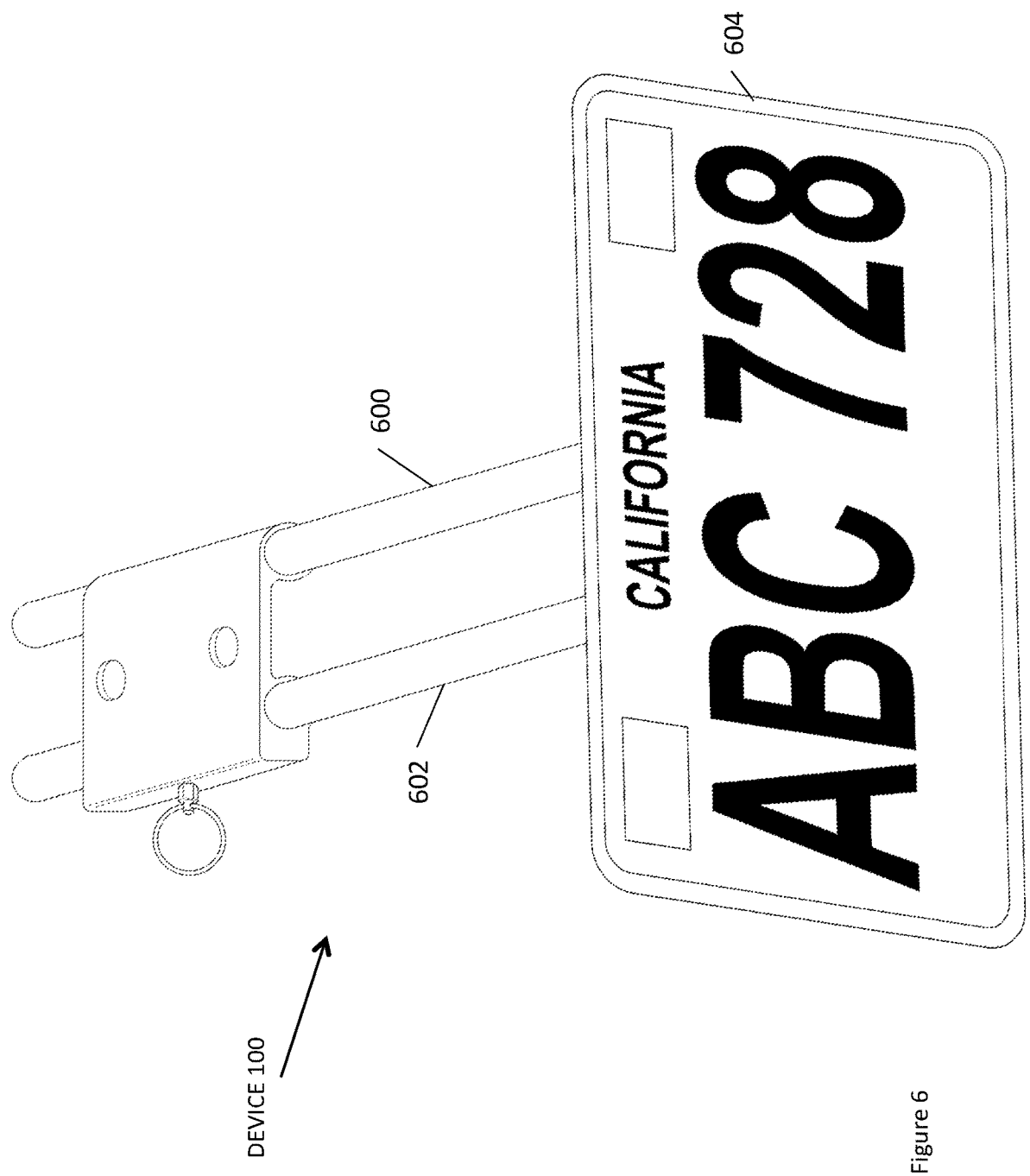
FIG. 6 is an upper perspective view of the first device of FIG. 1 coupled with posts that are attached to a license plate.

Referring now generally to the Figures and particularly to FIG. 6, FIG. 6 is an upper perspective view of the first device 100 coupled with the first post 600 and a second post 602 that are each in turn coupled with a license plate 604.

Figure 7:
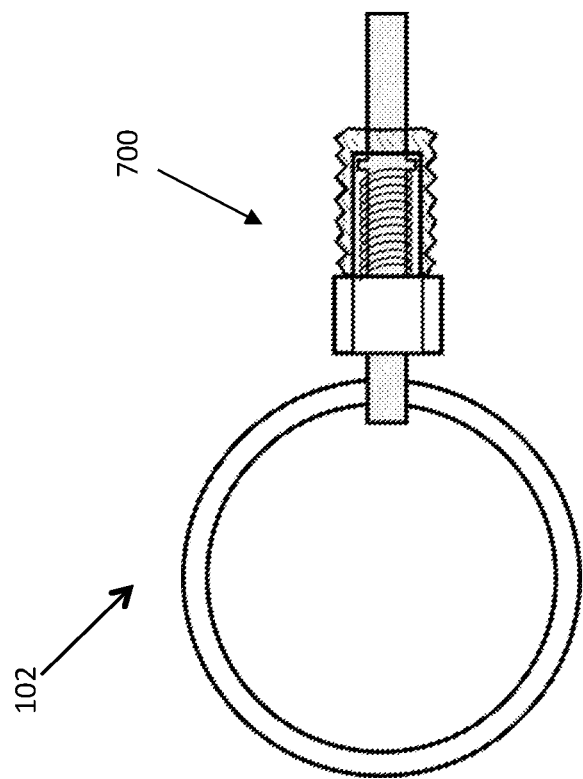
FIG. 7 is a front plan view of the moveable element of FIG. 1 in a first spring biased state, wherein the moveable element is suited for pressing against a post of FIG. 6 when the post is inserted into the unitary body.

Referring now generally to the Figures and particularly to FIG. 7, FIG. 7 is a front plan view of the moveable element 102 in a first spring biased state 700, wherein the moveable element 102 is suited for pressing against the first post 600 when the first post 600 is inserted into the first channel 110 of the unitary body 104.

Figure 8:
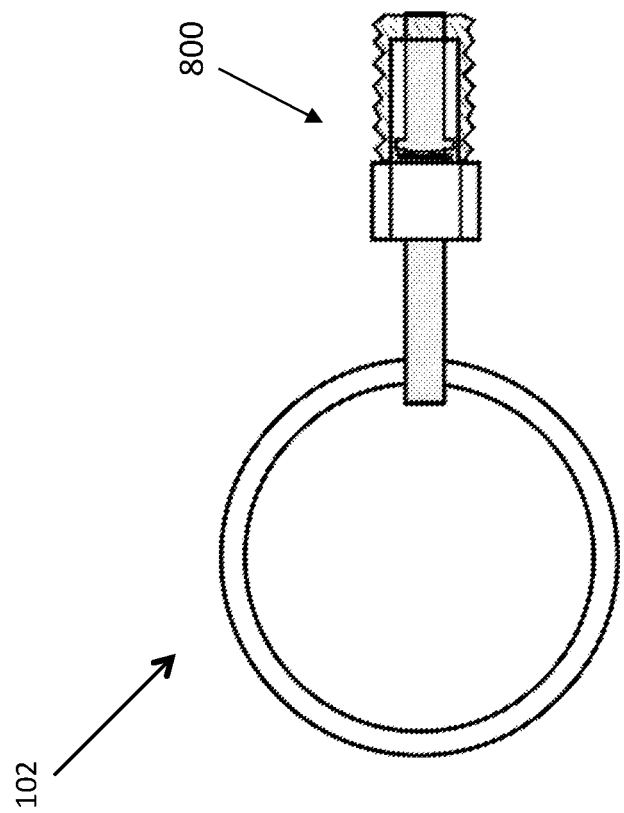
FIG. 8 is a front plan view of the moveable element of FIG. 1 in a second spring biased state, wherein the moveable element is suited for isolation from a post of FIG. 6 even while the post is inserted into the unitary body.

Referring now generally to the Figures and particularly to FIG. 8, FIG. 8 is a front plan view of the moveable element 102 in a second spring biased state 800, wherein the moveable element 102 is suited for isolation from the first post 600 of FIG. 6 even while the first post 600 is inserted into the first channel 110 of the unitary body 104.

Figure 9:
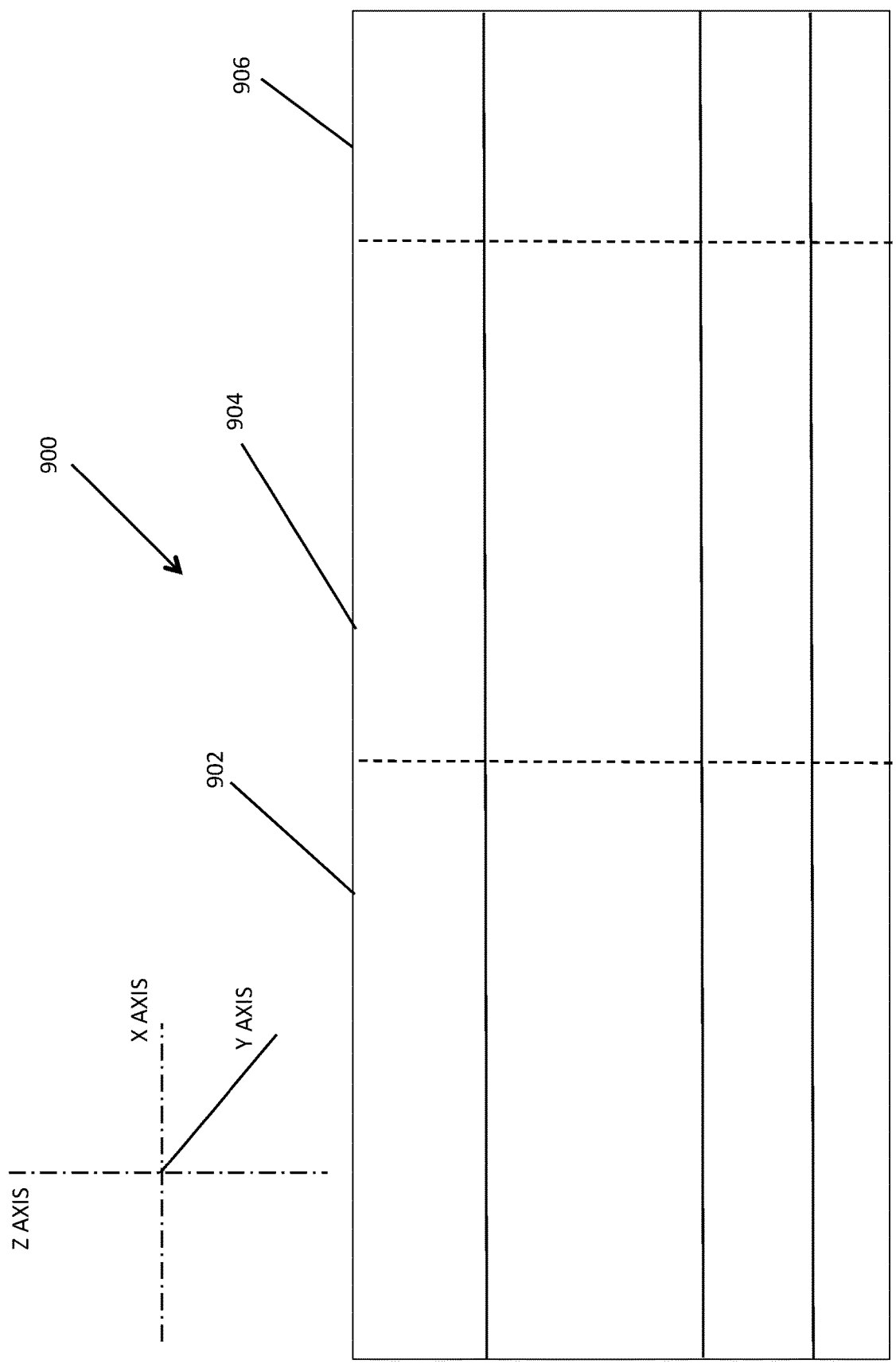
FIG. 9 is a front plan view of an extruded piece from which one or more instances of the first device of FIG. 1 may be partially formed by separation of the extruded piece into two or more sections.

Referring now generally to the Figures and particularly to FIG. 9, FIG. 9 is a front plan view of an extruded piece 900 from which one or more instances of the first device 100 may be partially formed by separation of the extruded piece 900 into two or more sections 902 & 904 & 906.

Various alternative production techniques may be used to produce the unitary body 104. For example, the unitary body 104 may be 3D printed. For example, the unitary body 104 can be 3D printed using Selective Laser Melting (SLM) techniques. Selective laser melting is a particular rapid prototyping, e.g., 3D printing, Additive Manufacturing (AM) technique, etc., designed to use a high power-density laser to melt and fuse metallic powders together. Additionally, the SLM process can fully melt the metal material forming the unitary body 104 into a solid 3D-dimensional article of manufacture. For example, the unitary body 104 may be 3D printed as a solid piece, wherein a 3D printing device can be configured to manufacture, i.e., print, the unitary body 104 including a structurally integrated printing of the first elongate tubing 106 and the second elongate tubing. As set forth above, the unitary body 104 may be formed of metal. Additionally or alternatively, the unitary body 104 may be formed of metal. For example, the 3D printing device operating based on the SLM process may print the unitary body 104 using a suitable metal powder known in the art.

Figure 10:
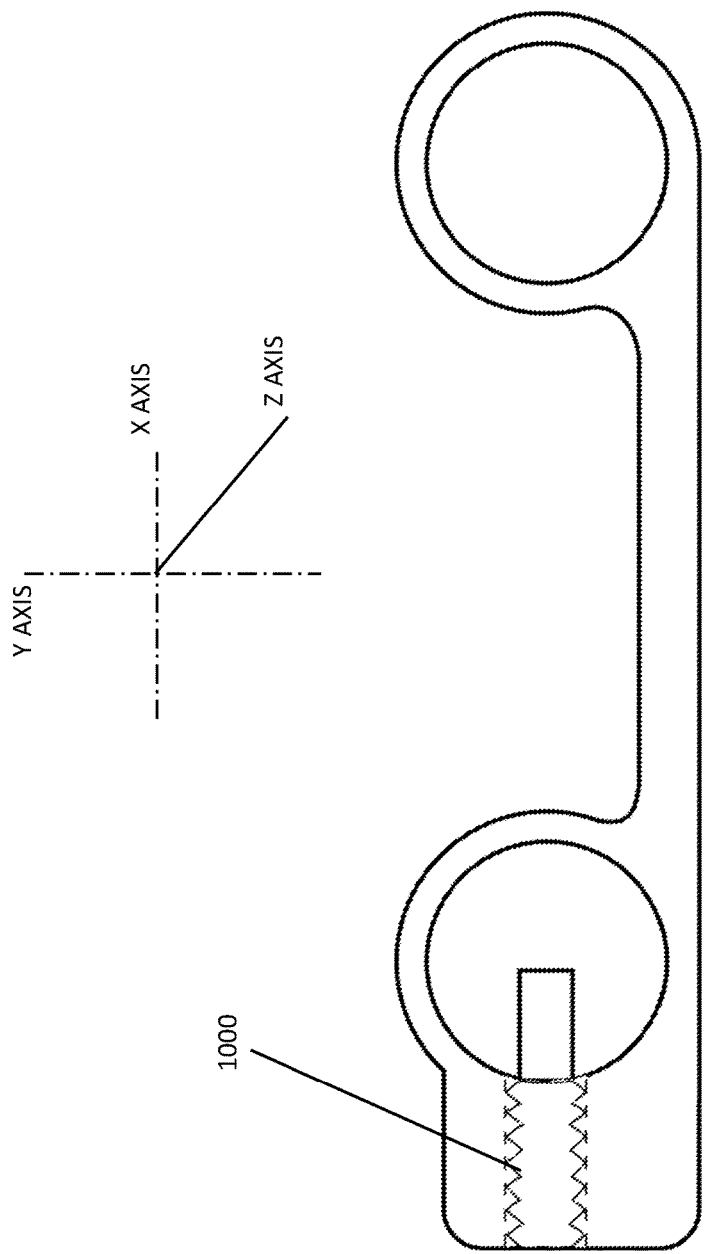
FIG. 10 is a front view of the device of FIG. 1 and further including a set screw.

Referring now generally to the Figures and particularly to FIG. 10, FIG. 10 is a front view of the device 100 of FIG. 1 and further including a set screw 1000. The set screw 1000 is sized and shaped to engaged with the tapped first aperture 122 and to extend into the first channel 110 and to press against the first post 600. It is understood that the first post may include a notch (not shown) that is sized to partially accept the set screw 1000 and thereby enable a convenient registration of the set screw 1000 when inserted into this notch of the first post 600.

Figure 11A:
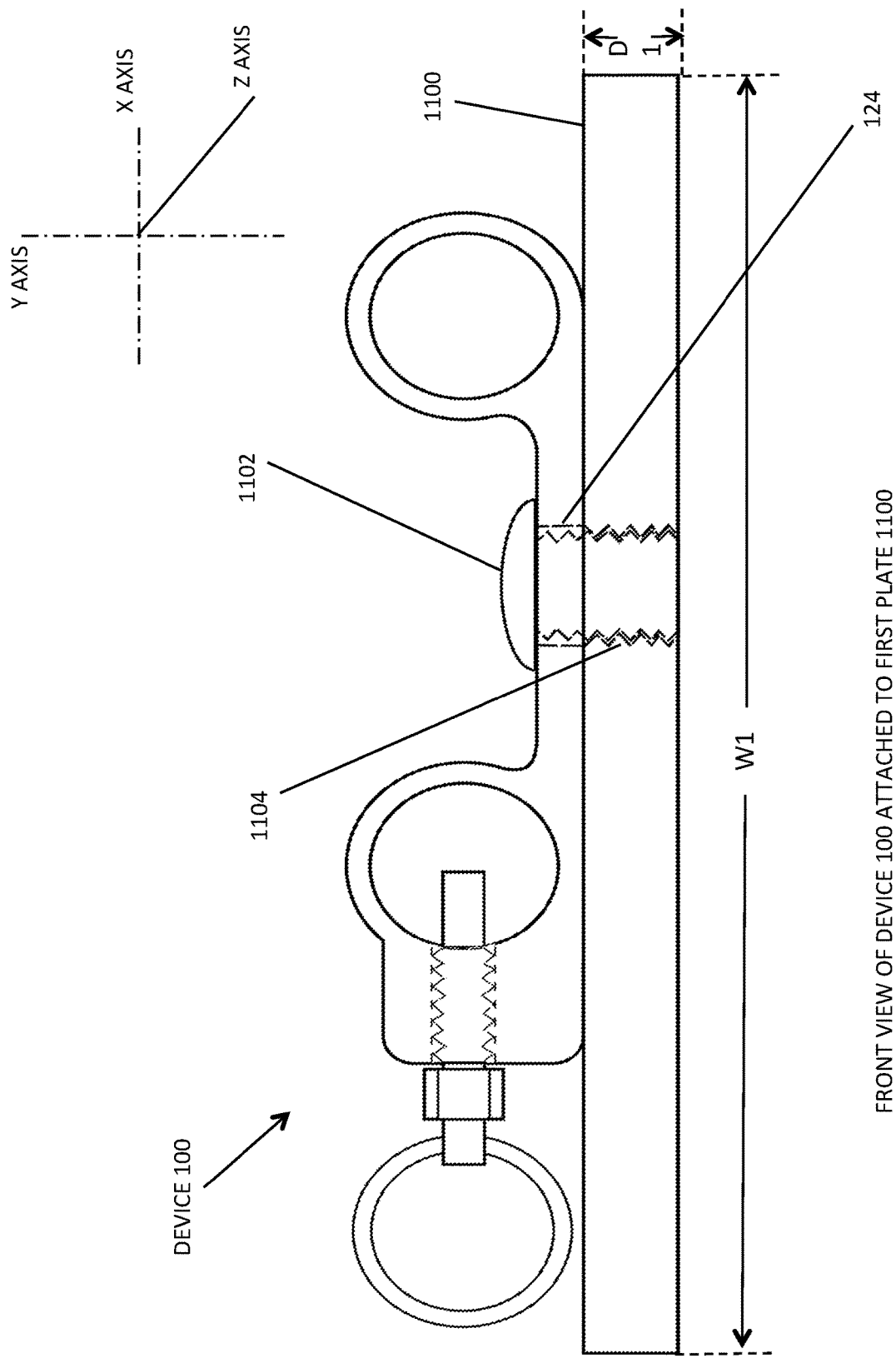
FIG. 11A is a front view of the device of FIG. 1 coupled with a first plate.

Referring now generally to the Figures and particularly to FIG. 11A, FIG. 11A is a front view of the device 100 coupled with a first plate 1100. A first fastener screw 1102 passes through both the first attachment aperture 124 of the first device 100 and engages with a first threaded hole 1104 of the first plate 1100. The first plate 1100 presents a thickness or depth of D1 extending along the Y axis and a width of W1 extending along the X axis.

Figure 11B:
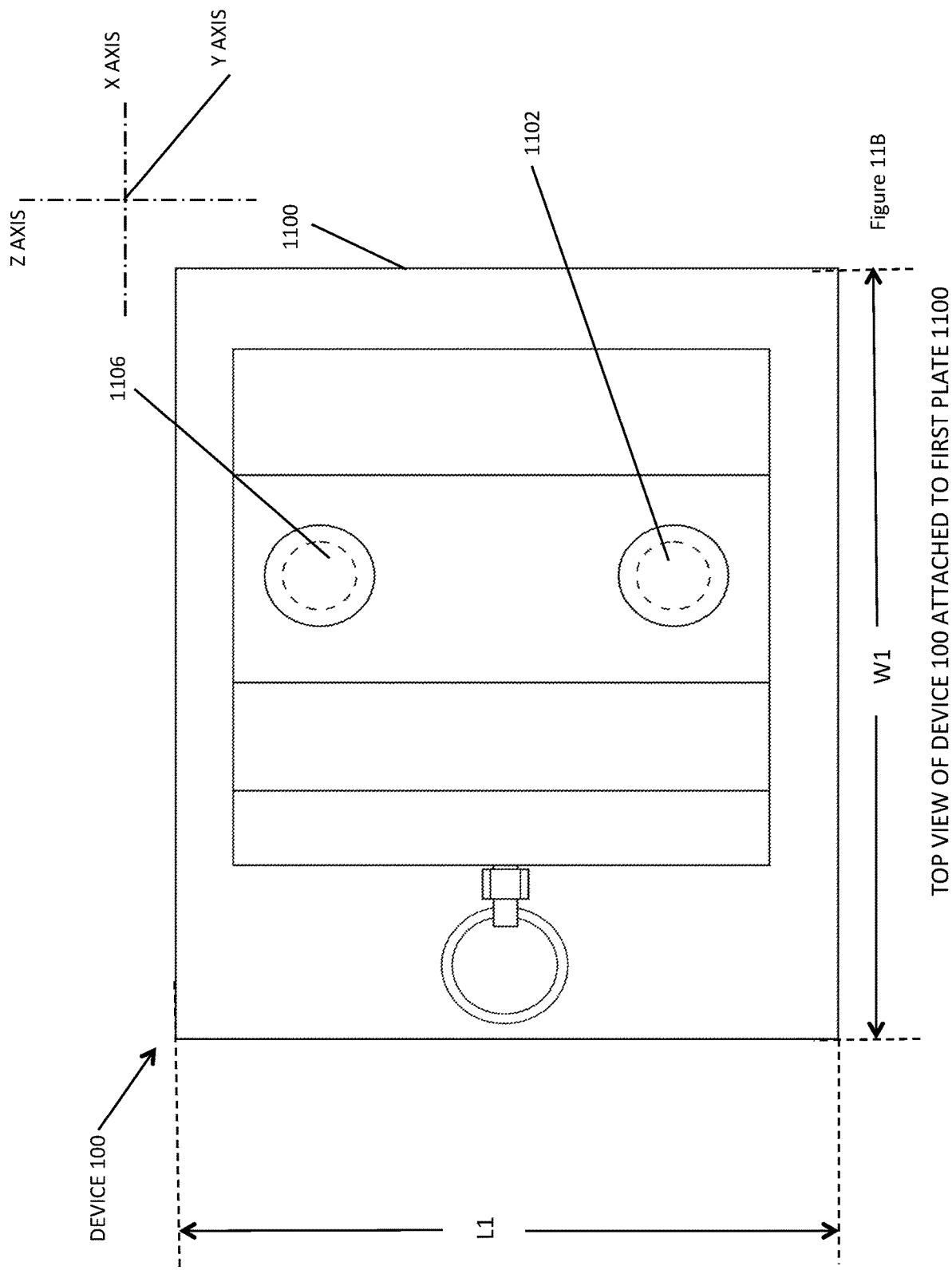
FIG. 11B is a top view of the device of FIG. 1 coupled with the first plate of FIG. 11A.

Referring now generally to the Figures and particularly to FIG. 11B, FIG. 11B is a top view of the device 100 coupled with the first plate 1100. A second threaded screw 1106 passes through the first device 100. The first plate 1100 presents a length L1 extending along the Y axis and a width of W1 extending along the X axis.

Figure 11C:
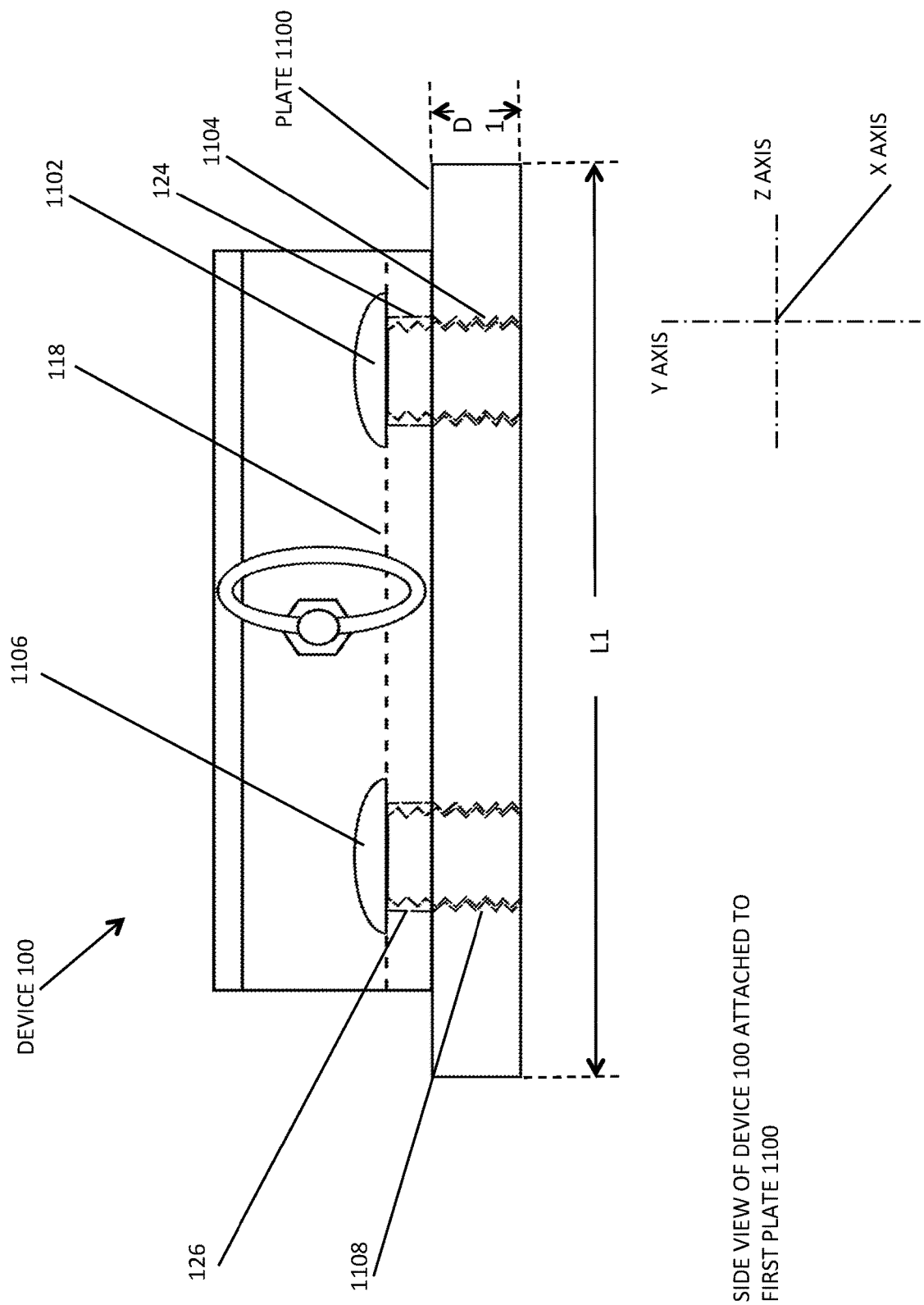
FIG. 11C is a side view of the device of FIG. 1 coupled with the first plate of FIG. 11A.

Referring now generally to the Figures and particularly to FIG. 11C, FIG. 11C is a side view of the device 100 coupled with the first plate 1100. The second threaded screw 1106 passes through both the second attachment aperture 126 of the first device 100 and engages with a second threaded hole 1108 of the first plate 1100.

Figure 12A:
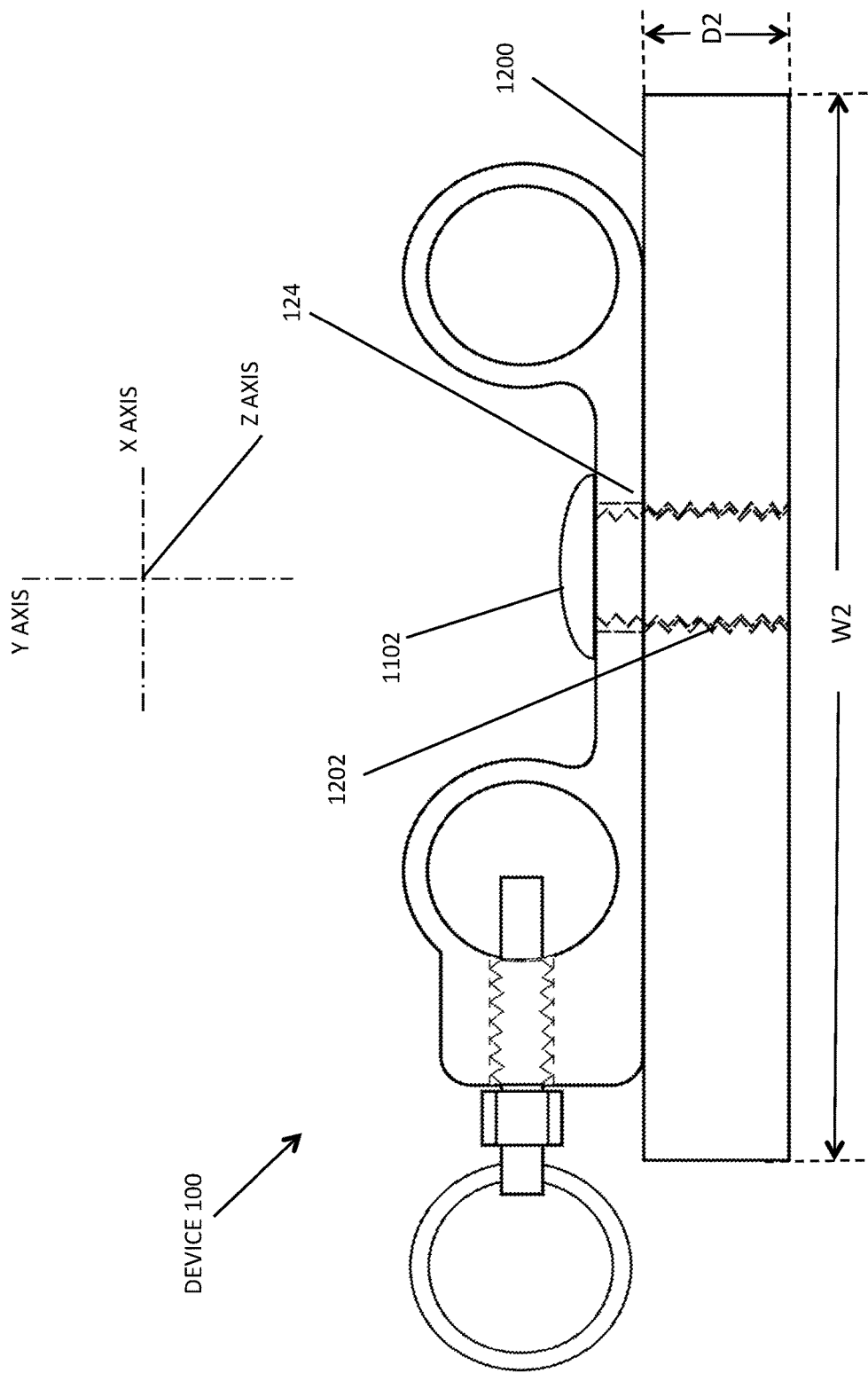
FIG. 12A is a front view of the device of FIG. 1 coupled with a second plate.

Referring now generally to the Figures and particularly to FIG. 12A, FIG. 12A is a front view of the device 100 coupled with a second plate 1200. The first fastener screw 1102 passes through both the first attachment aperture 124 of the first device 100 and engages with a first alternate threaded hole 1202 of the second plate 1200. The second plate 1200 presents a thickness or depth of D2 extending along the Y axis and a width of W2 extending along the X axis.

Figure 12B:
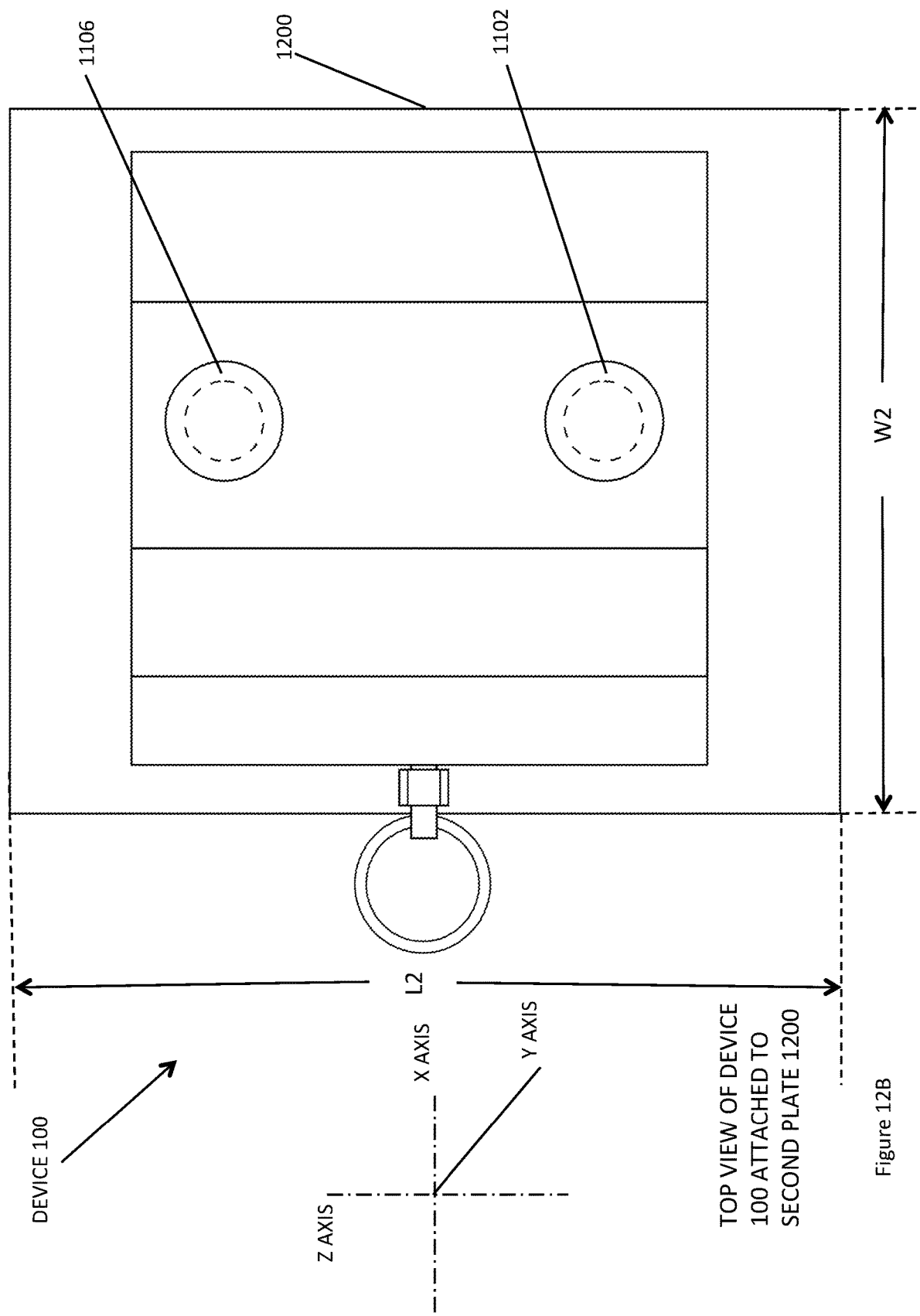
FIG. 12B is a top view of the device of FIG. 1 coupled with the second plate of FIG. 12A.

Referring now generally to the Figures and particularly to FIG. 12B, FIG. 12B is a top view of the device 100 coupled with the second plate 1200. The second threaded screw 1106 passes through the first device 100. The second plate 1200 presents a length L2 extending along the Y axis and a width of W2 extending along the X axis.

Figure 12C:
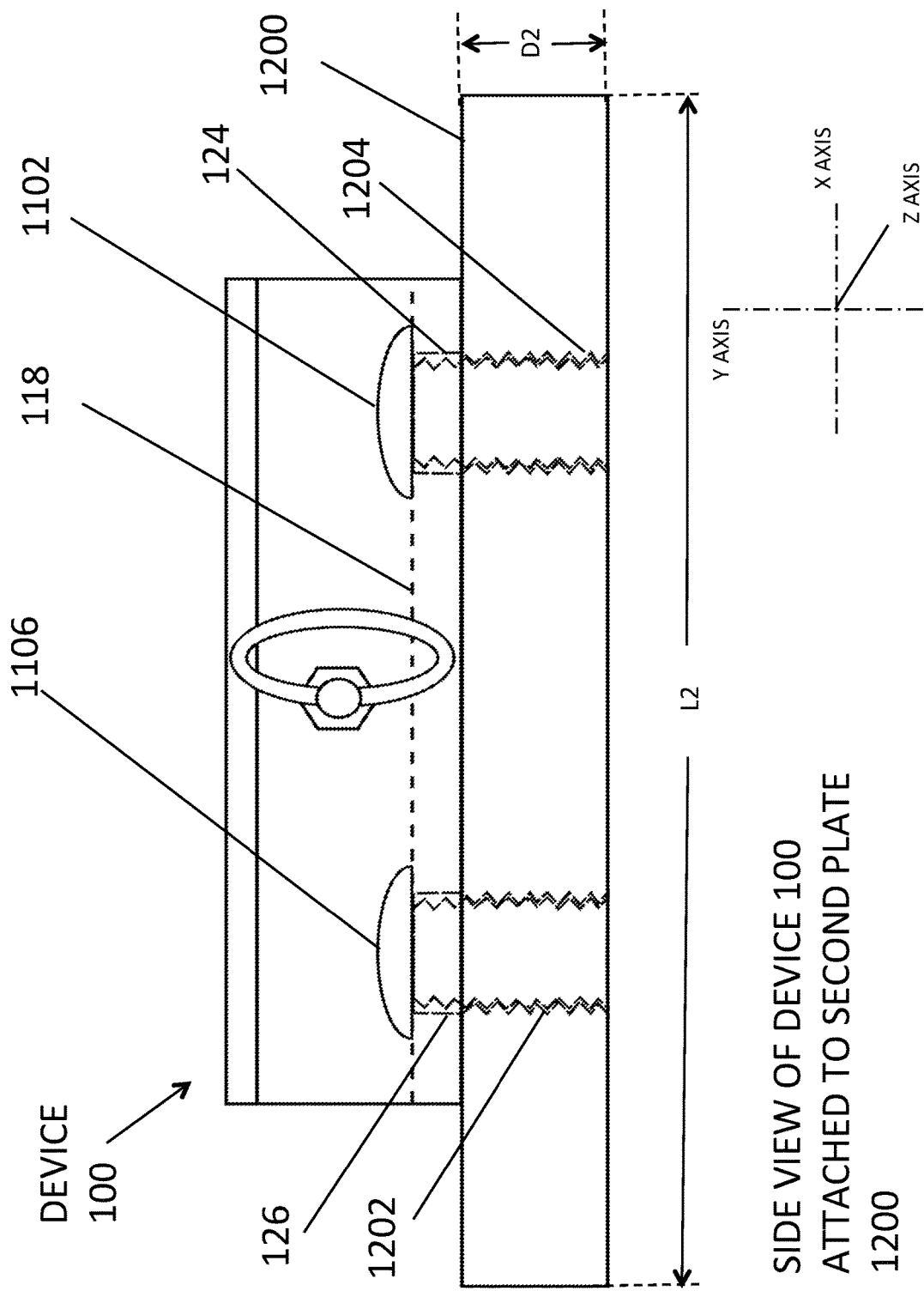
FIG. 12C is a side view of the device of FIG. 1 coupled with the second plate of FIG. 12A.

Referring now generally to the Figures and particularly to FIG. 12C, FIG. 12C is a side view of the device 100 coupled with the second plate 1200. The second threaded screw 1106 passes through both the second attachment aperture 126 of the first device 100 and engages with a second alternate threaded hole 1204 of the second plate 1200.

Referring now generally to the Figures and particularly to FIG. 13A, FIG. 13A is a front view of a second invented device 1300 having a first ovoid channel 1302 and a second ovoid channel 1304.

Referring now generally to the Figures and particularly to FIG. 13B, FIG. 13B is a front view of a third invented device 1306 having a first orthogonal channel 1308 and a second orthogonal channel 1310.

Referring now generally to the Figures and particularly to FIG. 13C, FIG. 13C is a front view of a fourth device 1312 having a first triangular channel 1314 and a second triangular channel 1316.

Figure 14B:
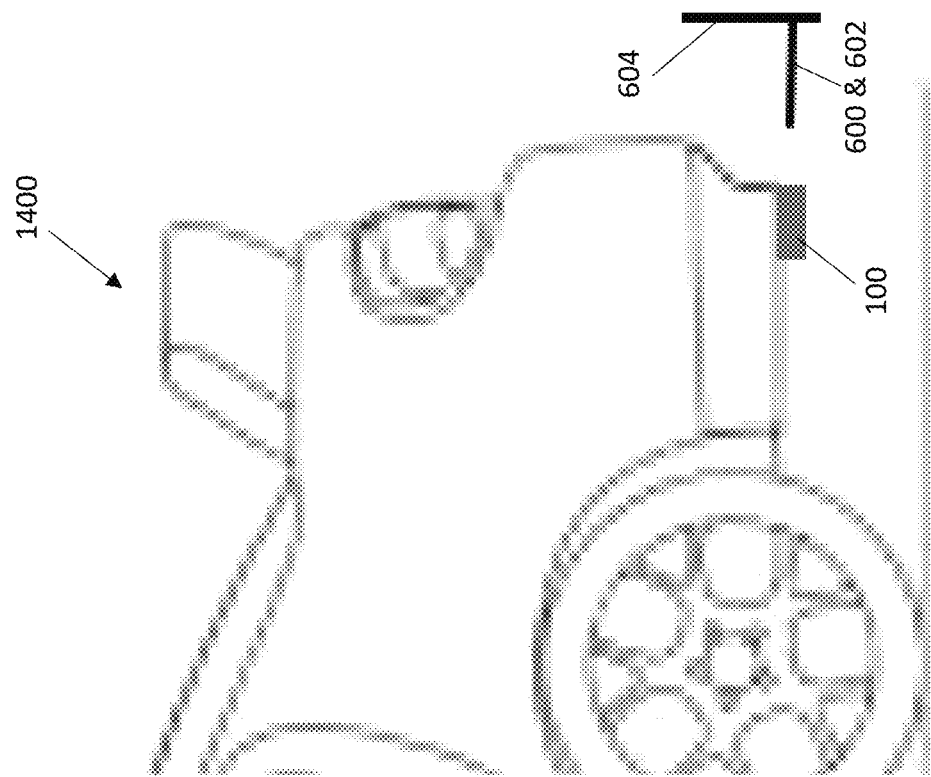
FIG. 14B is a side view of the rear of a vehicle equipped with the device of FIG. 6 in a detached position.
Figure 14A:
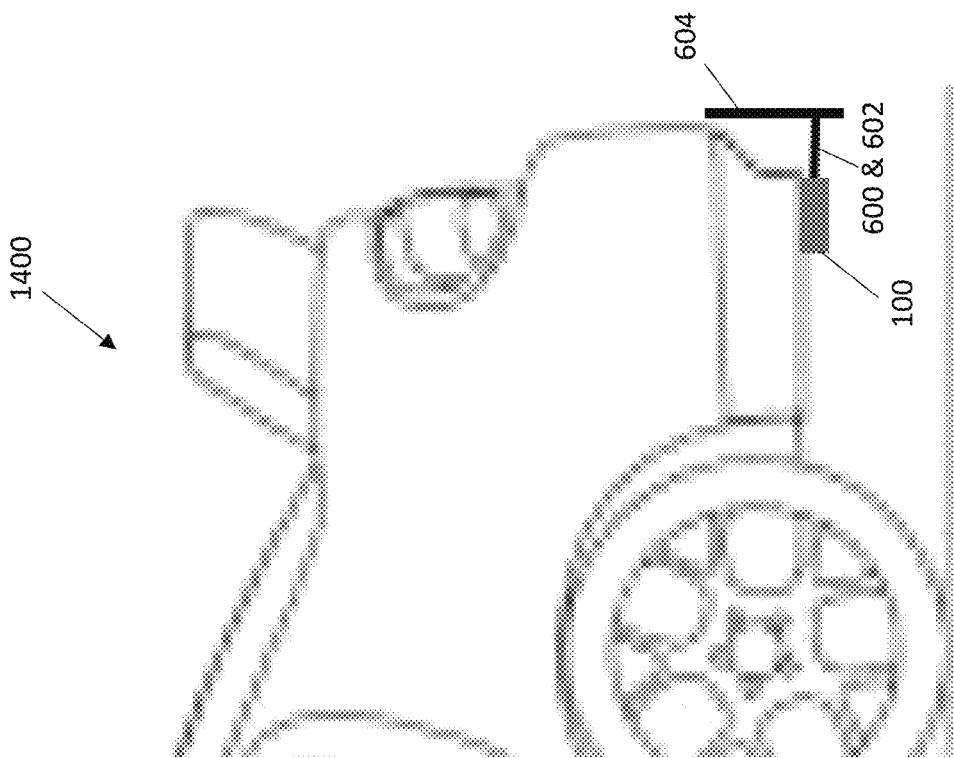
FIG. 14A is a side view of the rear of a vehicle equipped with the device of FIG. 6 in a fastened position.

Referring now generally to the Figures and particularly to FIGS. 14A & 14B, FIGS. 14A & 14B are side views of the rear end of a vehicle 127 equipped with the invented device. FIG. 14A presents the invented device in an attached position, with the first post 600 & second post 602 secured within the device 100, and thus detachably attaching the license plate 604 to the vehicle 127 in accordance with the method of the invention. FIG. 14B presents the same elements, with the license plate 604 and posts 600 & 602 detached from the device 100, and thus uninstalled from the vehicle 127.

Figure 15B:
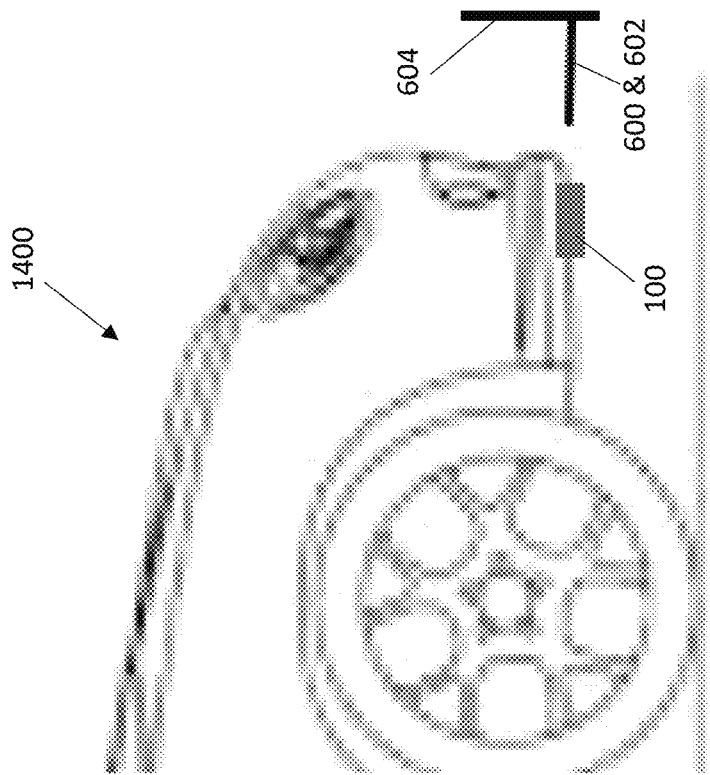
FIG. 15B is a side view of the front of a vehicle equipped with the device of FIG. 6 in a detached position.
Figure 15A:
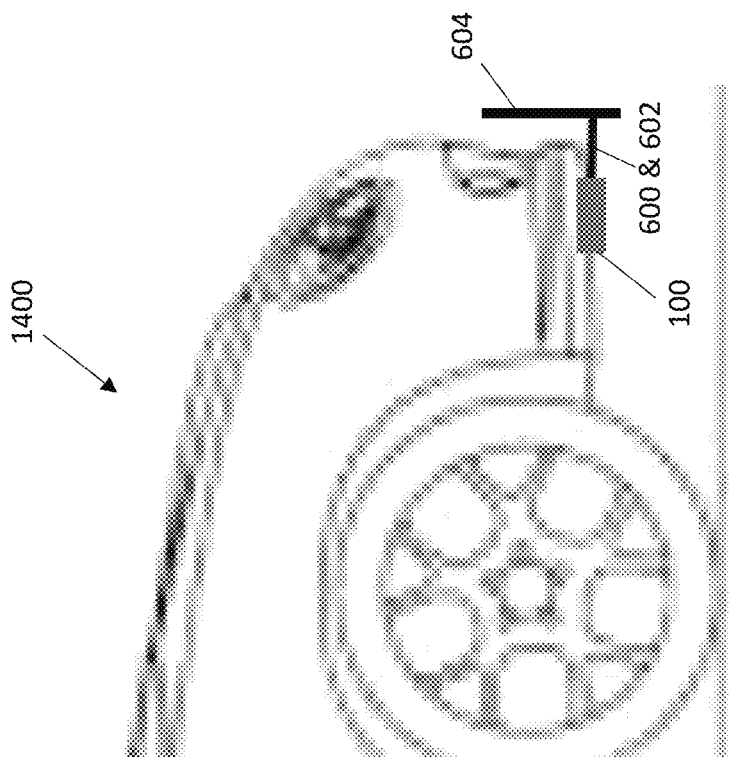
FIG. 15A is a side view of the front of a vehicle equipped with the device of FIG. 6 in a fastened position.

Referring now generally to the Figures and particularly to FIGS. 15A & 15B, FIGS. 15A & 15B are side views of the front end of the vehicle 127 equipped with the invented device. FIG. 15A presents the invented device in an attached position, with the first post 600 & second post 602 secured within the device 100, and thus detachably attaching the license plate 604 to the front of the vehicle 127. FIG. 15B presents the same elements as FIG. 15A, with the license plate 604 and posts 600 & 602 detached from the device 100, and thus uninstalled from the vehicle 127.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, or manufacturing processes described herein may be performed or implemented with one or more hardware or software modules, alone or in combination with other devices. In one embodiment, a software module is implemented with a computer program product comprising a non-transitory computer-readable medium containing computer program code, which can be executed by a computer aided manufacturing system for fabricating the invented device and/or performing any or all of the steps, operations, or processes described. This apparatus may be specially constructed for the required purposes. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to an apparatus for performing the operations herein. Embodiments of the invention may also relate to a product that is produced by a manufacturing process described herein. Such a product may comprise information resulting in part from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

I claim:

1. A device configured for attachment to a vehicle, the device comprising:
    a unitary body affixed to the vehicle and forming a first elongate tubing forming a first channel having a first aperture and a second elongate tubing, and the first elongate tubing and the second elongate tubing extending from a joining feature, and the first channel extending at least partially through the first elongate tubing; and
    a moveable element, the moveable element removably extending through the first aperture and at least partially into the first channel of the first elongate tubing.

2. The device of claim 1, wherein the unitary body is attached to an underside of vehicle and the moveable element is coupled with a vehicular license plate.

3. The device of claim 1, further comprising:
    a second channel extending at least partially through the second elongate tubing, and the second channel having a second aperture;
    a second moveable element, the second moveable element removably extending through the second aperture of the second channel and at least partially into the second channel of the second elongate tubing, wherein the unitary body is attached to a vehicle body and the moveable element and the second moveable element are coupled with a vehicular license plate.

4. The device of claim 1, wherein the moveable element comprises a spring biasing element.

5. The device of claim 1, wherein the first elongate tubing includes an elongate formation extending in parallel with a first channel of the first elongate tubing.

6. The device of claim 1, wherein the first aperture extends fully through the elongate formation and to the first channel.

7. The device of claim 1, wherein the first elongate tubing forms a first channel and the second elongate tubing forms a second channel and the first channel and the second channel are substantively parallel.

8. The device of claim 1, wherein the first elongate tubing forms a first channel and the second elongate tubing forms a second channel and the first channel and the second channel are substantively equal in size and shape.

9. The device of claim 1, wherein the second channel is substantively circular in cross section.

10. The device of claim 1, wherein the second channel is substantively ovoid in cross section.

11. The device of claim 1, wherein the second channel is substantively orthogonal in cross section.

12. The device of claim 1, wherein the second channel is substantively triangular in cross section.

13. The device of claim 1, wherein the first channel and a second channel formed by the second elongate tubing are substantively equal in cross section.

14. The device of claim 1, wherein the first elongate tubing and the second elongate tubing extend from a same side of the joining feature.

15. The device of claim 1, wherein the unitary body comprises an extrusion.

16. The device of claim 1, wherein the unitary body is extruded prior to formation of the first aperture.

17. The device of claim 1, wherein the unitary body comprises material selected from the group of materials consisting of metal, metal alloy, aluminum, iron, steel, plastic, and thermoplastic.

18. The device of claim 1, wherein the device comprises a manufactured element selected from the element group of a 3d printed piece, a molded piece, a machined piece, and a milled piece.

19. The device of claim 18, wherein the manufactured element comprises a unitary body forming a first elongate tubing and a second elongate tubing extending from a joining feature, and a first aperture extending through the first elongate tubing.

20. The device of claim 1, wherein the first aperture is tapped and the moveable element is threaded and sized to engage within the tapped first aperture.

21. The device of claim 20, wherein the moveable element comprises a set screw.

22. The device of claim 20, wherein the moveable element comprises a spring loaded pull pin.

* * * * *